United States Patent
Justak

(10) Patent No.: US 7,410,173 B2
(45) Date of Patent: Aug. 12, 2008

(54) HYDRODYNAMIC BRUSH SEAL

(76) Inventor: John F. Justak, 641 SE. Central Pkwy., Stuart, FL (US) 34994

( * ) Notice: Subject to any disclaimer, the term of this patent is extended or adjusted under 35 U.S.C. 154(b) by 39 days.

(21) Appl. No.: 11/669,454

(22) Filed: Jan. 31, 2007

(65) Prior Publication Data

US 2007/0120327 A1 May 31, 2007

Related U.S. Application Data

(63) Continuation-in-part of application No. 11/226,836, filed on Sep. 14, 2005, now Pat. No. 7,182,345, which is a continuation of application No. 10/832,053, filed on Apr. 26, 2004, now abandoned.

(60) Provisional application No. 60/466,979, filed on May 1, 2003.

(51) Int. Cl.
*F16D 11/02* (2006.01)
*F01D 25/00* (2006.01)
*F01D 5/20* (2006.01)

(52) U.S. Cl. ............ 277/355; 415/231; 415/173.1

(58) Field of Classification Search ........ 277/355; 415/231, 173.1
See application file for complete search history.

(56) References Cited

U.S. PATENT DOCUMENTS

| | | |
|---|---|---|
| 3,917,150 A | 11/1975 | Ferguson et al. |
| 4,411,594 A | 10/1983 | Pellow et al. |
| 4,600,202 A | 7/1986 | Schaeffler et al. |
| 5,026,252 A | 6/1991 | Hoffelner |
| 5,181,728 A | 1/1993 | Stec |
| 5,183,197 A | 2/1993 | Howe |
| 5,755,445 A | 5/1998 | Arora |
| 5,799,952 A | 9/1998 | Morrison et al. |
| 5,944,320 A | 8/1999 | Werner et al. |
| 5,997,004 A | 12/1999 | Braun et al. |
| 6,079,714 A | 6/2000 | Kemsley |
| 6,079,945 A | 6/2000 | Wolfe et al. |
| 6,254,344 B1 | 7/2001 | Wright et al. |
| 6,428,009 B2 | 8/2002 | Justak |
| 6,558,041 B2 | 5/2003 | Laos |
| 6,840,519 B2 | 1/2005 | Dinc et al. |
| 7,182,345 B2 | 2/2007 | Justak |

FOREIGN PATENT DOCUMENTS

| | | |
|---|---|---|
| DE | 957 006 A | 1/1957 |
| EP | 0 778 431 A1 | 6/1997 |
| GB | 355570 A | 8/1931 |
| JP | 4347066 A | 12/1992 |
| WO | 01/48887 A2 | 7/2001 |

*Primary Examiner*—Vishal Patel
(74) *Attorney, Agent, or Firm*—GrayRobinson, PA

(57) ABSTRACT

A hybrid brush seal is provided for sealing a circumferential gap between two machine components that are relatively rotatable with respect to each other having seal bristles mounted in a ring shape on a first machine component with bristle ends directed at the sealing surface of the second, rotating machine component. The bristle ends are kept from direct contact with the rotating machine component via one or more shoes which create a non-contact seal with the rotating machine component which is enhanced by the imposition of one or more spring elements connected between the machine component and shoes.

5 Claims, 5 Drawing Sheets

HYDRODYNAMIC BRUSH SEAL

RELATED APPLICATIONS

This application is a continuation-in-part application of U.S. patent application Ser. No. 11/226,836 filed Sep. 14, 2005 now U.S. Pat. No. 7,182,345, which is a continuation of U.S. patent application Ser. No. 10/832,053 filed Apr. 26, 2004 now abandoned which claims the benefit of U.S. Provisional Application Ser. No. 60/466,979 filed May 1, 2003 under 35 U.S.C. § 119(e) for all commonly disclosed subject matter. U.S. Provisional Application Ser. No. 60/466,979 is expressly incorporated herein by reference in its entirety to form part of the present disclosure.

FIELD OF THE INVENTION

This invention relates to seals for sealing a circumferential gap between two machine components that are relatively rotatable with respect to each other, and, more particularly, to a hybrid brush seal having seal bristles mounted in a ring shape on a first machine component with bristle ends directed at the sealing surface of the second, rotating machine component. The bristle ends are kept from direct contact with the rotating machine component via one or more shoes which create a non-contact seal with the rotating machine component which is enhanced by the imposition of one or more spring elements connected between the machine component and shoes.

BACKGROUND OF THE INVENTION

Turbomachinery, such as gas turbine engines employed in aircraft, currently is dependent on either labyrinth (see FIGS. 1A-1E), brush (see FIGS. 2A and 2B) or carbon seals for critical applications. Labyrinth seals provide adequate sealing, however, they are extremely dependent on maintaining radial tolerances at all points of engine operation. The radial clearance must take into account factors such as thermal expansion, shaft motion, tolerance stack-ups, rub tolerance, etc. Minimization of seal clearance is necessary to achieve maximum labyrinth seal effectiveness. In addition to increased leakage if clearances are not maintained, such as during a high-G maneuver, there is the potential for increases in engine vibration. Straight-thru labyrinth seals (FIG. 1A) are the most sensitive to clearance changes, with large clearances resulting in a carryover effect. Stepped labyrinth seals (FIGS. 1B and 1C) are very dependent on axial clearances, as well as radial clearances, which limits the number of teeth possible on each land. Pregrooved labyrinth seals (FIG. 1D) are dependent on both axial and radial clearances and must have an axial clearance less than twice the radial clearance to provide better leakage performance than stepped seals.

Other problems associated with labyrinth seals arise from heat generation due to knife edge to seal land rub, debris from hardcoated knife edges or seal lands being carried through engine passages, and excessive engine vibration. When seal teeth rub against seal lands, it is possible to generate large amounts of heat. This heat may result in reduced material strength and may even cause destruction of the seal if heat conducted to the rotor causes further interference. It is possible to reduce heat generation using abradable seal lands, however, they must not be used in situations where rub debris will be carried by leakage air directly into critical areas such as bearing compartments or carbon seal rubbing contacts. This also holds true for hardcoats applied to knife edges to increase rub capability. Other difficulties with hardcoated knife edges include low cycle fatigue life debits, rub induced tooth-edge cracking, and the possibility of handling damage. Engine vibration is another factor to be considered when implementing labyrinth seals. As mentioned previously, this vibration can be caused by improper maintenance of radial clearances. However, it can also be affected by the spacing of labyrinth seal teeth, which can produce harmonics and result in high vibratory stresses.

In comparison to labyrinth seals, brush seals can offer very low leakage rates. For example, flow past a single stage brush seal is approximately equal to a four knife edge labyrinth seal at the same clearance. Brush seals are also not as dependent on radial clearances as labyrinth seals. Leakage equivalent to approximately a 2 to 3 mil gap is relatively constant over a large range of wire-rotor interferences. However, with current technology, all brush seals will eventually wear to line on line contact at the point of greatest initial interference. Great care must be taken to insure that the brush seal backing plate does not contact the rotor under any circumstances. It is possible for severing of the rotor to occur from this type of contact. In addition, undue wire wear may result in flow increases up to 800% and factors such as changes in extreme interference, temperature and pressure loads, and rubbing speeds must be taken into account when determining seal life.

The design for common brush seals, as seen in FIGS. 2A and 2B, is usually an assembly of densely packed flexible wires sandwiched between two plates. The free ends of the wires protrude beyond the plates and contact a land or runner, with a small radial interference to form the seal. The wires are angled so that the free ends point in the same direction as the movement of the runner. Brush seals are sized to maintain a tight diametral fit throughout their useful life and to accommodate the greatest combination of axial movement of the brush relative to the rotor.

Brush seals may be used in a wide variety of applications. Although brush seal leakage generally decreases with exposure to repeated pressure loading, incorporating brush seals where extreme pressure loading occurs may cause a "blow over" condition resulting in permanent deformation of the seal wires. Brush seals have been used in sealing bearing compartments, however coke on the wires may result in accelerated wear and their leakage rate is higher than that of carbon seals.

One additional limitation of brush seals is that they are essentially unidirectional in operation, i.e., due to the angulation of the individual wires, such seals must be oriented in the direction of rotation of the moving element. Rotation of the moving element or rotor in the opposite direction, against the angulation of the wires, can result in permanent damage and/or failure of the seal. In the particular application of the seals required in the engine of a V-22 Osprey aircraft, for example, it is noted that during the blade fold wing stow operation, the engine rotates in reverse at very low rpm's. This is required to align rotor blades when stowing wings. This procedure is performed for creating a smaller aircraft footprint onboard an aircraft carrier. Reverse rotation of the engine would damage or create failure of brush seals such as those depicted in FIGS. 2A and 2B.

One attempt to limit wear of brush seals is disclosed in U.S. Pat. No. 5,026,252 to Hoffelner in which a sliding ring is interposed between the bristle pack of the seal and the moving element or rotor to avoid direct contact therebetween. The bristle ends are received within a circumferential groove in the sliding ring and are allowed to freely float or move within such groove. Although bristle wear may be reduced in this design, it is believed that the seal created at the interface of the sliding ring and rotor is unsatisfactory.

An improvement of prior brush seals, including that disclosed in the '252 patent to Hoffelner noted above, is found in my U.S. Pat. No. 6,428,009. In that design, one end of each of a plurality of seal bristles is fixed in an annular shape and mounted to the fixed machine component or stator while their opposite ends are attached to a number of individual shoes located proximate the rotating machine component or rotor. Prior to shaft rotation, the shoes are in contact with the rotor surface with preferably the leading edge of each shoe set to have less contact than the trailing edge of the shoe. When the rotor begins to rotate, a hydrodynamic wedge is created which lifts the shoe slightly off the surface of the shaft allowing the shoe to effectively float over the shaft at a design gap. It has been found that one limitation of the design disclosed in the '009 patent is a potential problem with "roll over" under pressure load, i.e. the shoes can tip or pivot in the axial direction thus creating a leakage path.

Carbon seals are generally used to provide sealing of oil compartments and to protect oil systems from hot air and contamination. Their low leakage rates in comparison to labyrinth or brush seals are well-suited to this application, however they are very sensitive to pressure balances and tolerance stack-ups. Pressure gradients at all operating conditions and especially at low power and idle conditions must be taken into account when considering the use of carbon seals. Carbon seals must be designed to have a sufficiently thick seal plate and the axial stack load path must pass through the plate as straight as possible to prevent coning of the seal. Another consideration with carbon seals is the potential for seepage, weepage or trapped oil. Provisions must be made to eliminate these conditions which may result in oil fire, rotor vibration, and severe corrosion.

According to the Advanced Subsonic Technology Initiative as presented at the NASA Lewis Research Center Seals Workshop, development of advanced sealing techniques to replace the current seal technologies described above will provide high returns on technology investments. These returns include reducing direct operating costs by up to 5%, reducing engine fuel burn up to 10%, reducing engine oxides of emission by over 50%, and reducing noise by 7 dB. For example, spending only a fraction of the costs needed to redesign and re-qualify complete compressor or turbine components on advanced seal development can achieve comparable performance improvements. In fact, engine studies have shown that by applying advanced seals techniques to just a few locations can result in reduction of 2.5% in SFC.

SUMMARY OF THE INVENTION

A hybrid brush seal is provided which is generally similar to the one disclosed in my prior U.S. Pat. No. 6,428,009, but which overcomes the tendency of the shoes to roll over under the application of a pressure load.

In one presently preferred embodiment, two sets or bundles of seal bristles are axially spaced from one another, i.e. in the direction of the longitudinal axis of two relatively rotating machine components such as the rotor and stator of a gas turbine engine. One end of the seal bristles in each bundle is fixed in an annular shape to either the stator or the rotor, while the opposite end of the seal bristles in each bundle extends to one or more shoes circumferentially disposed about the other machine component. The shoes are located with respect to the rotor or stator to create a seal between the two while avoiding contact of the seal bristles with the relatively rotating component. Each of the shoes is connected at discrete points to the end of the seal bristles such that the leading edge of the shoe is oriented to have less contact with the rotor or the stator than the trailing edge of the shoe. In one embodiment, each shoe is connected at two spaced locations to the abutting seal bristles by electron beam welding or similar mounting techniques, thus creating two hinge points for the shoe to translate about.

In alternative embodiments, one or more bundles or seal bristles are mounted at one end to either the rotor or the stator, and their opposite end extends toward one or more shoes located proximate the other of the rotor or stator. A spring element is connected between the shoes and the rotor or stator which is flexible in the radial direction, but axially stiff. The spring element functions to assist in preventing roll over of the shoes with respect to the rotor or stator where it is located, thus maintaining an effective seal under pressure load. In one embodiment, stops are provided to limit the extent of radial motion of the shoe with respect to the rotor or stator. It is contemplated that the ends of the seal bristles proximate the shoes can be either connected to the shoes such as by welding or other means of attachment, or spaced from the shoes. In either case, the seal bristles act as a secondary seal between the rotor and stator in combination with the shoes.

In operation, the shoes of this invention function very similarly to that of a tilting pad bearing shoe. Prior to rotation of the rotor, the shoe is in contact with the rotor or stator surface. Because the leading edge of the shoe has less contact with the rotor or stator than its trailing edge, when the rotor begins to rotate a hydrodynamic wedge is created that lifts the shoe slightly off of the surface of the rotor or stator. Consequently, the shoe "floats" over the rotor or stator at a design gap, such as 0.0005 to 0.0010 inches, thus forming a non-contact seal.

The advantages of the hybrid brush seal of this invention are many. It has the same sealing characteristics of existing brush seals, but will never change in performance due to bristle wear. The brush seal backing plate can be moved further outboard of the I.D. because the shoe prevents the bristles from bending over in high pressure applications. Each shoe may have a certain amount of interference with the rotor or stator prior to rotation. Thus, the seal can be slightly off center during assembly but once rotation begins, each pad will lift-off. Hence, tight tolerances can be relaxed.

The hybrid seal of this invention can be utilized in all seal applications, including labyrinth, brush and carbon. The robust design eliminates the careful handling now required of carbon seals utilized in lube system compartments. This seal may allow the engine designer to utilize less parts in the assembly as this seal will permit "blind" assemblies to occur.

The following table provides a comparison of the seal of the subject invention with currently available technology.

| Seal Type | Wear Rate | Leakage | Dependence on Clearances | Contamination Potential |
|---|---|---|---|---|
| Labyrinth Seals | High | Low | High | High |
| Brush Seals | Medium | Low | Medium | Medium |
| Carbon Seals | Medium | Very Low | High | Low |
| Hybrid Seal | Low | Low | Low | Low |

DESCRIPTION OF THE DRAWINGS

The structure, operation and advantages of this invention will become further apparent upon consideration of the following description, taken in conjunction with the accompanying drawings, wherein.

DETAILED DESCRIPTION OF THE PREFERRED EMBODIMENTS

Figure 1A:
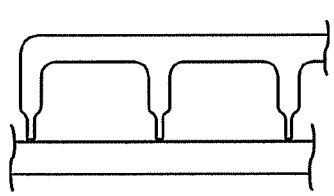
FIGS. 1A-1E are schematic views of a number of prior art labyrinth seals.
Figure 1B:
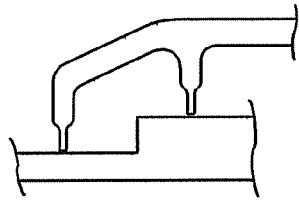
Figure 1C:
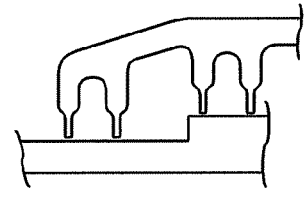
Figure 1D:
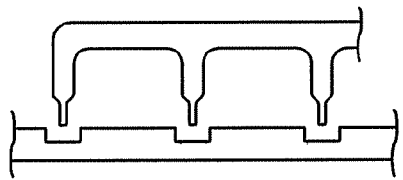
Figure 1E:
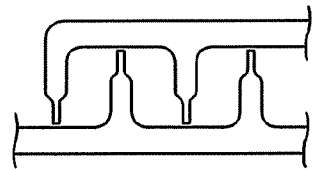
Figure 2A:
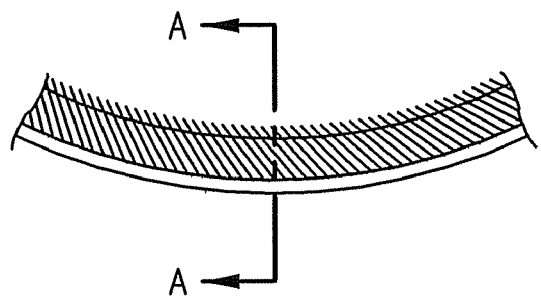
FIGS. 2A and 2B depict views of a prior art brush seal.
Figure 2B:
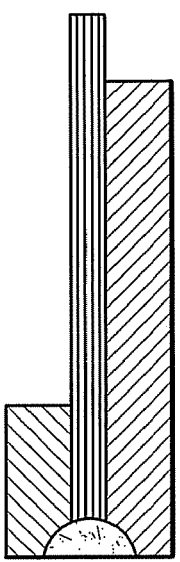
Figure 3:
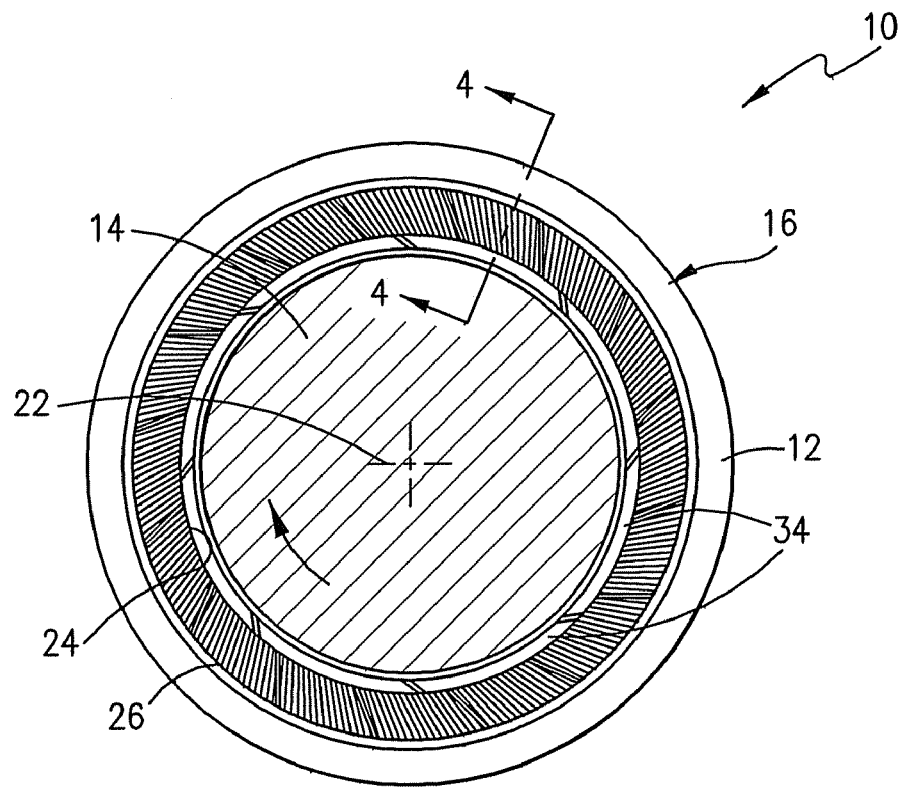
FIG. 3 is a cross sectional view of one embodiment of the hybrid brush seal of this invention.
Figure 4:
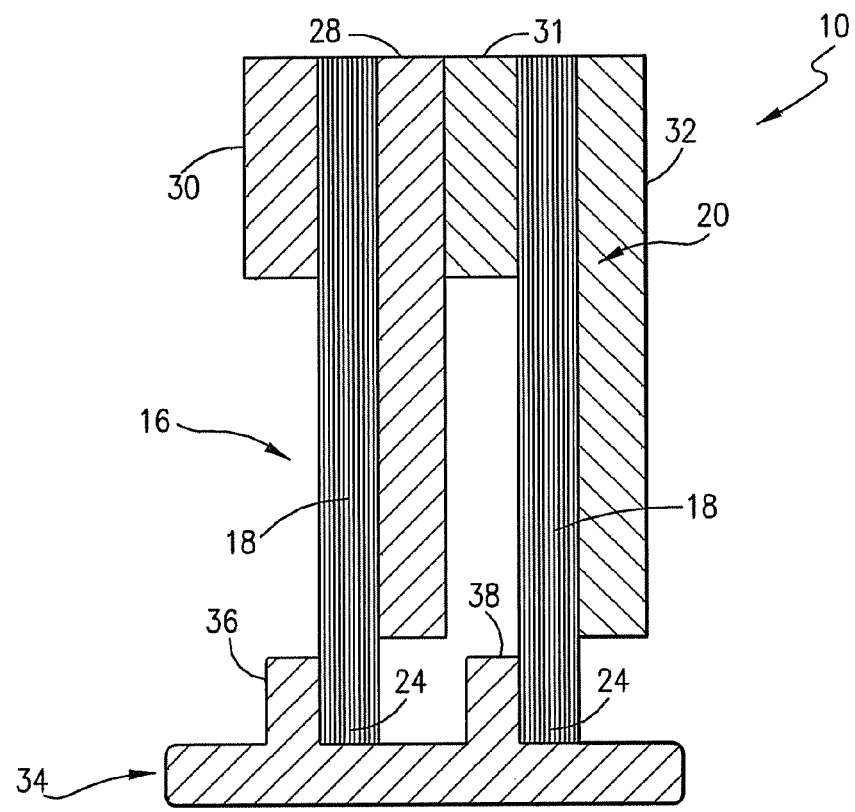
FIG. 4 is a schematic, elevational view of the seal shown in FIG. 3.
Figure 5:
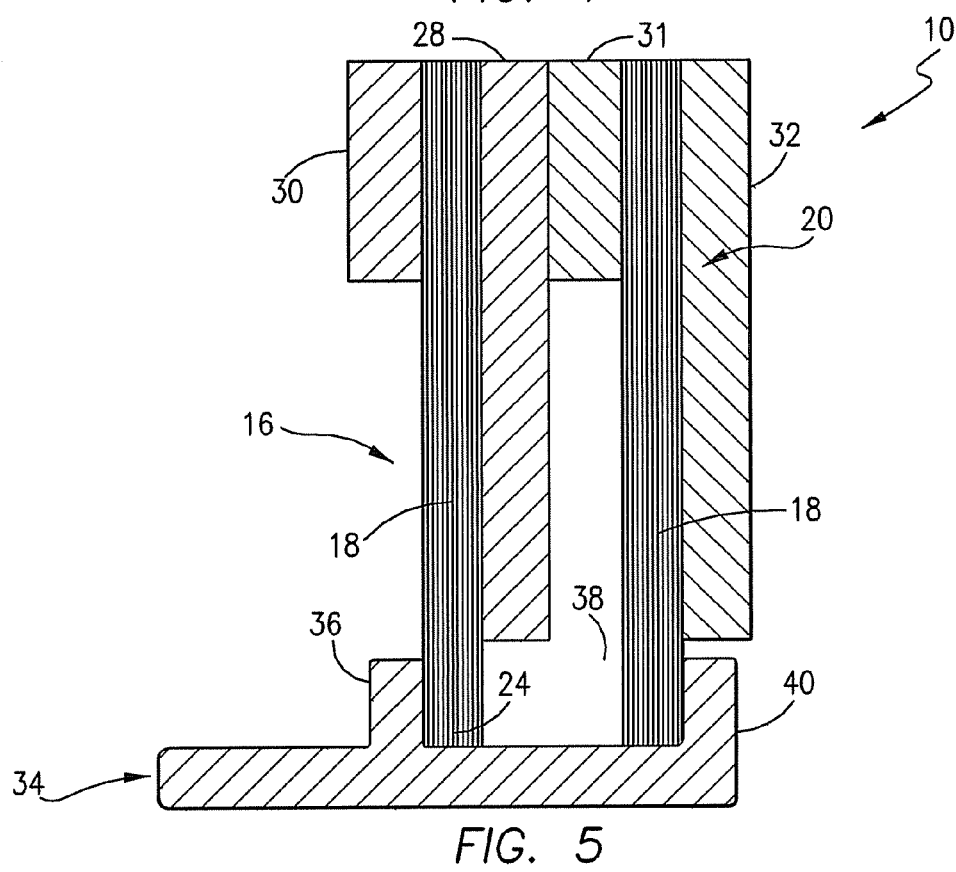
FIG. 5 is a view similar to FIG. 4, except of an alternative embodiment herein.

Referring initially to FIGS. 3-5, the hybrid bush seal 10 of this invention is intended to create a seal between two relatively rotating components, namely, a fixed stator 12 and a rotating rotor 14. In this embodiment, the seal 10 comprises a first group or bundle 16 of seal bristles 18 and a second bundle 20 of seal bristles 18 which are axially spaced from the first bundle 16. As used herein, the term "axial" or "axially spaced" refers to a direction along the longitudinal axis of the stator 12 and rotor 14, e.g. axis 22 in FIG. 3, whereas "radial" refers to a direction perpendicular to the longitudinal axis 22.

The seal bristles 18 in each bundle 16 and 20 have an inner end 24 and an outer end 26. In the embodiment illustrated in FIGS. 3 and 4, the outer end 26 of the seal bristles 18 in each bundle 16, 20 is affixed to the stator 12. For purposes of the present discussion, the construction and operation of the seal 10 herein is described with the seal bristles 18 in that orientation. It should be understood, however, that the inner end 24 of the seal bristles 18 could be affixed to the rotor 14. Preferably, the seal bristles 18 are mounted to the stator 12 or rotor 14 by clamping, welding, brazing or other means of affixation. The seal bristles 18 in each bundle 16 and 20 are arranged in an annular shape corresponding to the circumferential gap between the stator 12 and rotor 14. As best seen in FIGS. 4 and 5, a spacer plate 28 is located in the axial space between the seal bristle bundles 16 and 20. The seal bristles 18 in bundle 16 are captured between a high pressure backing plate 30 associated with the stator 12 and the spacer plate 28, whereas the seal bristles 18 in bundle 20 extend between a second spacer plate 31 and a low pressure backing plate 32.

In one presently preferred embodiment, the seal bristles 18 are formed of a wire material, but it is contemplated that different materials may be utilized depending upon environmental conditions of the particular sealing application. In the past, brush seal materials, including the seal bristles, were chosen primarily for their high temperature and wear capability properties. The bristle seals 18 of this invention do not contact the rotor 14, as discussed below, and therefore different wear characteristics and other considerations are involved in the selection of appropriate materials for the bristle seals 18 as compared to conventional brush seals. The bristle seal 18 geometry may be angled in the direction of rotation of the rotor 14, or, alternatively, the bristle seals 18 may be straight and have varied angles. The bristle seals 18 may be round, square, rectangular or other shapes, and, if round, the diameter of each bristle seal 18 can be varied depending on the nature of the sealing environment. The outer end 26 of the bristle seals 18 in each bundle 16 and 20 may be fused together or free to move independently. Further, the number of seal bristles 18 within each bundle 16 and 20 can be varied with the understanding that more seal bristles 18 generally leads to improved sealing.

The inner end 24 of the seal bristles 18 in each bundle abut one or more shoes 34 located in sealing relationship to the rotor 14. In the embodiment of FIG. 4, the shoes 34 are formed with axially spaced ridges 36 and 38. One side of the bundle 16 of seal bristles 18 abuts the ridge 36, and one side of the bundle 20 of seal bristles 18 abuts the ridge 38. FIG. 5 depicts a slightly different construction of shoes 34 in which the ridge 36 is the same as that in FIG. 4, but a ridge 40 is formed on the shoes 34 in position to contact the opposite side of the bundle 20 of seal bristles 18 compared to the FIG. 4 embodiment. In both cases, each shoe 34 is attached at discrete locations to the abutting seal bristles 18 such as by welding, brazing, clamping or other means. The arc length, width, height, geometry and surface characteristics of the shoes 34 can be varied to enhance hydrodynamic pressure between the rotor 14 and stator 12, to balance the static pressures within the system to vary the pressure sealing capabilities of the seal 10 and for other purposes. Preferably, the shoes 34 are made from sheet metal stampings or similar materials, to reduce manufacturing costs.

Figure 6:
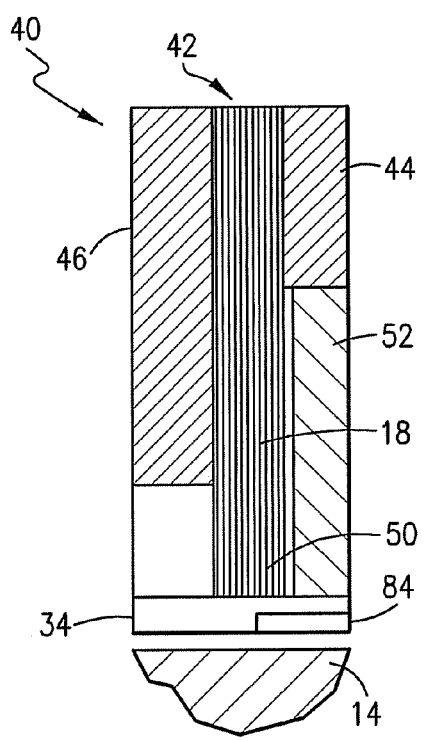
FIG. 6 is a schematic, elevational view of an alternative embodiment of the seal herein employing a single bundle of seal bristles and axially spaced spring elements.

Referring now to FIGS. 6-9, alternative embodiments of a brush seal of this invention are shown. In FIG. 6, a brush seal 40 is shown in which a single bundle 42 of seal bristles 18 is located between a high pressure backing plate 44 and a low pressure backing plate 46. For purposes of the present discussion, and consistent with the description of the previous embodiments, an outer end 48 of each seal bristle 18 in bundle 42 is mounted to the stator 12 while the inner end 50 extends toward the rotor 14. It should be understood that the seal bristles 18 in bundle 42 could be affixed to the rotor 14 instead of the stator 12.

In the embodiments of FIGS. 3-5, axial rigidity and radial compliance of the seal 10 is provided by the seal bristles 18 in the bundles 16 and 20 through their connection between the stator 12 and shoes 34. In the embodiment of FIG. 6, the seal bristles 18 in the bundle 42 need not be connected to a shoe 34. Instead, a spring element 52 is connected between the high pressure backing plate 44 and the shoe 34. The spring element 52 provides essentially the same resistance to roll over of the seal 40 as the bundles 16 and 20 of seal bristles 18 in the seal 10 of FIGS. 3-5. Preferably, the spring element 52 is formed of spring steel or other material which is flexible in the radial direction but stiff in the axial direction.

Figure 7:
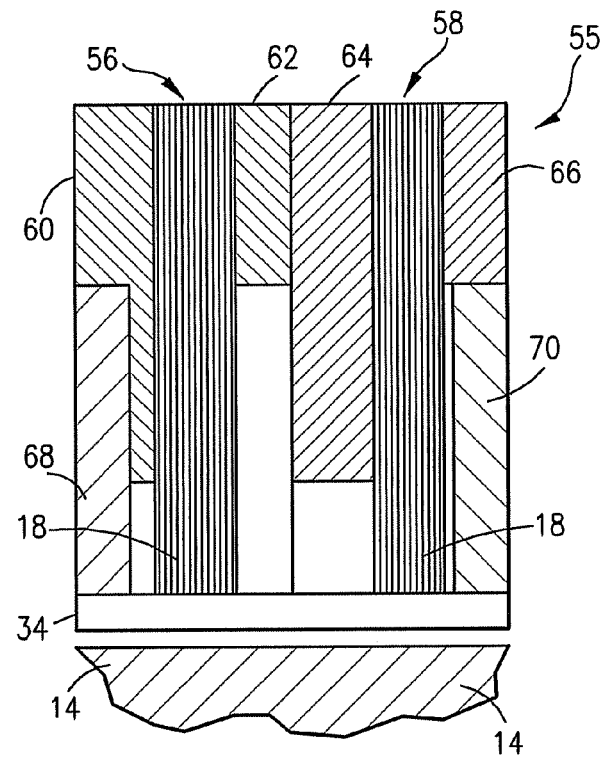
FIG. 7 is a view similar to FIG. 6, except employing two sets of axially spaced seal bristles.

The embodiment of FIG. 7 depicts a seal 55 which is similar to the seal 40 of FIG. 6, except that two axially spaced bundles 56 and 58 of seal bristles 18 are employed instead of one. The bundle 56 of seal bristles 18 is retained between a low pressure backing plate 60 and a spacer plate 62, whereas the bundle 58 is retained between a second spacer plate 64 and a high pressure backing plate 66. As in the embodiment of FIG. 6, the bristles 18 of each bundle 56, 58 need not be connected to a shoe 34. Axial rigidity and radial compliance are provided primarily by a spring element 68 connected between the low pressure backing plate 60 and shoe 34, and a second spring element 70 connected between the high pressure backing plate 66 and the shoe 34.

Figure 8:
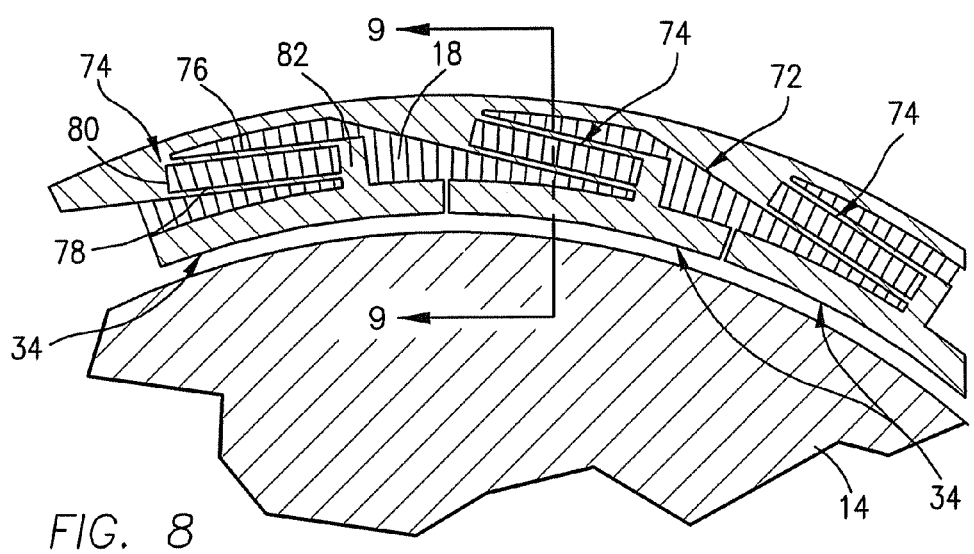
FIG. 8 is a cross sectional view of a further embodiment of the brush seal of this invention.
Figure 9:
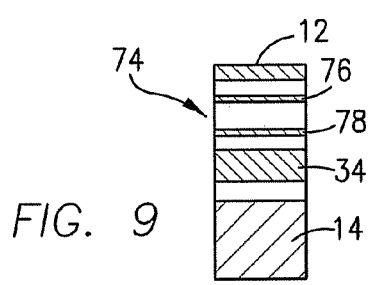
FIG. 9 is a cross sectional view taken generally along line 9-9 of FIG. 8.

Referring now to FIGS. 8 and 9, a still further embodiment of a seal 72 according to this invention is shown. The seal 72 is similar to that of seals 40 and 55 except for the spring elements 74. Each spring element 74 is essentially a rectangular-shaped beam with an outer band 76 radially spaced from an inner band 78. One end of each of the bands 76 and 78 is connected to a seat 80 formed in the stator 12, and the opposite end of bands 76, 78 mounts to a ridge 82 formed in a shoe 34. The spring element 74 functions to maintain the shoe 34 in sealing relationship with the rotor 14 in the same manner as the spring elements 52 and 68, 70. A bundle 72 of seal bristles 18 is fixed at its outer end to the stator 12, and the inner end of each seal bristle 18 extends toward the shoe 34 where it may or may not be affixed thereto. For purposes of illustration, three spring elements 74 each associated with a shoe 34 are shown in FIG. 8.

Figure 10:
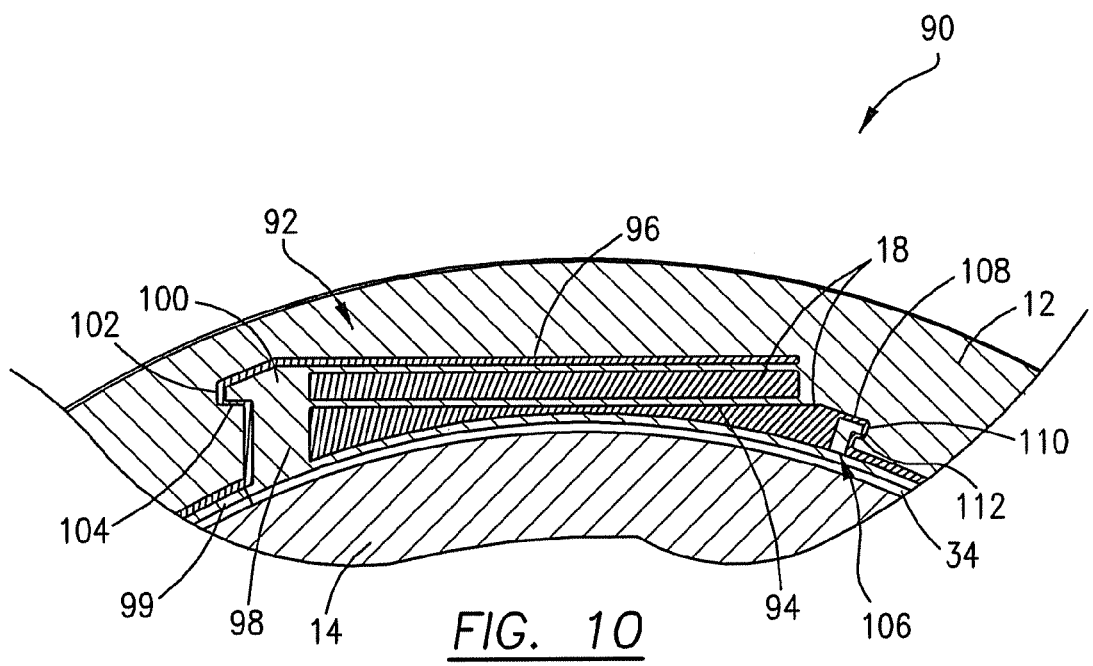
FIG. 10 is a cross sectional view of another embodiment of this invention, similar to FIGS. 8 and 9, but including stops to limit the radial movement of the shoes.

A variation of the seal 72 described above in connection with a discussion of FIGS. 8 and 9 is shown in FIG. 10. Under some operating conditions, particularly at higher pressures, it is desirable to limit the extent of axial movement of the shoe 34 with respect to the rotor 14 to maintain tolerances, e.g. the spacing between the shoe 34 and the facing surface of the rotor 14. The seal 90 of FIG. 10 includes a number of circumferentially spaced springs 92, the detail of one of which is shown in FIG. 10. Each spring 92 is formed with an inner band 94 and an outer band 96 radially outwardly spaced from the inner band 94. One end of each of the bands 94, 96 is mounted to or integrally formed with the stator 12 and the opposite end thereof is connected to a first stop 98. The first stop 98 includes a strip 99 which is connected to a shoe 34 (one of which is shown on FIG. 10), and has an arm 100 opposite the shoe 34 which may be received within a recess 102 formed in the stator 12. The recess 102 has a shoulder 104 positioned in alignment with the arm 100 of the first stop 98.

A second stop 106 is connected to or integrally formed with the strip 99, and, hence connects to the shoe 34. The second stop 106 is circumferentially spaced from the first stop 98 in a position near the point at which the inner and outer bands 94, 96 connect to the stator 12. The second stop 106 is formed with an arm 108 which may be received within a recess 110 in the stator 12. The recess 110 has a shoulder 112 positioned in alignment with the arm 108 of second stop 106.

The purpose of first and second stops 98 and 106 is to limit the extent of radially inward and outward movement of the shoe 34 with respect to the rotor 14. A gap is provided between the arm 100 of first stop 98 and the shoulder 114, and between the arm 108 of second stop 106 and shoulder 112, such that the shoe 34 can move radially inwardly relative to the rotor 14. Such inward motion is limited by engagement of the arms 100, 108 with shoulders 104 and 112, respectively, to prevent the shoe 34 from contacting the rotor 14 or exceeding design tolerances for the gap between the two. The arms 100 and 108 also contact the stator 12 in the event the shoe 34 moves radially outwardly relative to the rotor 14, to limit movement of the shoe 34 in that direction.

In each of the embodiments of FIGS. 6-10, the seal bristles 18 form essentially a secondary seal. The shoes 34 are maintained in position with respect to the stator 12 and rotor 14 by the spring elements 52, 68, 70, 74 and 92, which cooperate with the bristle bundles to resist roll over.

While the invention has been described with reference to a preferred embodiment, it should be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

For example, it has been found advantageous to provide a flow path in the shoes 34 of this invention to assist in balancing static pressure in the system. This flow path can take the form of a step 84 formed in the shoe 34, as depicted in FIG. 6.

Therefore, it is intended that the invention not be limited to the particular embodiments disclosed as the best mode contemplated for carrying out the invention, but that the invention will include all embodiments falling within the scope of the appended claims.

What is claimed is:

1. A brush seal for sealing a circumferential gap between a first machine component and a second machine component which is rotatable relative to the first machine component about a longitudinal axis, comprising:
    a bundle of seal bristles each having a first end and a second end, said first ends of said seal bristles being mounted to one of said first and second machine components and said second ends thereof extending in a direction toward the other of said first and second machine components;
    at least one shoe extending along one of said first or second machine components in a position to create a non-contact seal therewith, said at least one shoe preventing said second ends of said seal bristles from directly contacting either said first or second machine component;
    at least one spring element having radially spaced inner and outer bands, a first end of each of said inner and outer bands being connected to one of said first and second machine components and a second end of said inner and outer bands being connected to a first stop, said first stop being connected to said at least one shoe, at least a portion of said first stop being received within a first recess formed in one of said first and second machine components and being radially movable within said first recess in such a way as to limit the extent of radial movement of said at least one shoe.

2. The brush seal of claim 1 in which said first recess formed in one of said first and second machine components includes a shoulder, said first stop being formed with an arm which extends into said first recess in position to engage said shoulder to limit the extent of radial movement of said at least one shoe.

3. The brush seal of claim 1 further including a second stop connected to said at least one shoe, said second stop being circumferentially spaced from said first stop, at least a portion of said second stop being received within a second recess formed in one of said first and second machine components and being radially movable within said second recess in such a way as to limit the extent of radial movement of said at least one shoe.

4. The brush seal of claim 3 in which said second recess formed in one of said first and second machine components includes a shoulder, said second stop being formed with an arm which extends into said second recess in position to engage said shoulder to limit the extent of radial movement of said at least one shoe.

5. The brush seal of claim 3 in which each of said first and second stops is connected to said at least one shoe by a strip.

* * * * *